United States Patent [19]
Peng

[11] Patent Number: 6,111,770
[45] Date of Patent: *Aug. 29, 2000

[54] AUXILIARY RESONANT DC TANK CONVERTER

[75] Inventor: Fang Z. Peng, Knoxville, Tenn.

[73] Assignee: Lockheed Martin Energy Research Corporation, Oak Ridge, Tenn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/959,200

[22] Filed: Oct. 28, 1997

[51] Int. Cl.$^7$ ........................ H02M 7/537; H02M 7/521; H02M 7/5387
[52] U.S. Cl. ........................ 363/131; 363/132; 363/138
[58] Field of Search ........................ 363/35, 37, 51, 363/56, 131, 132, 138

[56] References Cited

U.S. PATENT DOCUMENTS

| | | | |
|---|---|---|---|
| 3,867,643 | 2/1975 | Baker et al. | 307/151 |
| 4,864,483 | 9/1989 | Divan | 363/37 |
| 5,172,309 | 12/1992 | DeDoncker et al. | 363/132 |
| 5,280,421 | 1/1994 | Dedoncker et al. | 363/98 |
| 5,559,685 | 9/1996 | Lauw et al. | 363/37 |
| 5,572,418 | 11/1996 | Kimura et al. | 363/97 |
| 5,574,636 | 11/1996 | Lee et al. | 363/132 |
| 5,594,634 | 1/1997 | Rajashekara et al. | 363/98 |
| 5,710,698 | 1/1998 | Lai et al. | 363/56 |

OTHER PUBLICATIONS

Taniguchi, K. et al "A PWM Method for Quasi–Resonant Zero–Voltage–Switching Inverter," *Electronic Power Supply Systems*, Brighton, Sep. 13–16, 1993, vol. 3, No. CON-F.Sep. 1993, pp. 41–45 XP000426758. , DeDoncker, R. W. et al, "The Auxiliary Quasi–Resonant DC Link Inverter" *Proceedings of the Annual Power Electronics Specialists Conference,* Massachusetts, Jun. 15–17, 1991, No. CONF. 22, Jun. 23, 1991, XP000293058.

*Primary Examiner*—Adolf Deneke Berhane
*Attorney, Agent, or Firm*—Joseph A. Marasco

[57] ABSTRACT

An auxiliary resonant dc tank (ARDCT) converter is provided for achieving soft-switching in a power converter. An ARDCT circuit is coupled directly across a dc bus to the inverter to generate a resonant dc bus voltage, including upper and lower resonant capacitors connected in series as a resonant leg, first and second dc tank capacitors connected in series as a tank leg, and an auxiliary resonant circuit comprising a series combination of a resonant inductor and a pair of auxiliary switching devices. The ARDCT circuit further includes first clamping means for holding the resonant dc bus voltage to the dc tank voltage of the tank leg, and second clamping means for clamping the resonant dc bus voltage to zero during a resonant period. The ARDCT circuit resonantly brings the dc bus voltage to zero in order to provide a zero-voltage switching opportunity for the inverter, then quickly rebounds the dc bus voltage back to the dc tank voltage after the inverter changes state. The auxiliary switching devices are turned on and off under zero-current conditions. The ARDCT circuit only absorbs ripples of the inverter dc bus current, thus having less current stress. In addition, since the ARDCT circuit is coupled in parallel with the dc power supply and the inverter for merely assisting soft-switching of the inverter without participating in real dc power transmission and power conversion, malfunction and failure of the tank circuit will not affect the functional operation of the inverter; thus a highly reliable converter system is expected.

19 Claims, 11 Drawing Sheets

AUXILIARY RESONANT DC TANK CONVERTER

STATEMENT REGARDING FEDERALLY SPONSORED RESEARCH

The United States Government has rights in this invention pursuant to contract No. DE-AC05-96OR22464 between the United States Department of Energy and Lockheed Martin Energy Research Corporation.

FIELD OF THE INVENTION

The present invention relates to soft-switching converters, and more particularly to an auxiliary resonant dc tank based converter to achieve soft and essentially lossless switching for power conversion.

BACKGROUND OF THE INVENTION

To reduce switching losses and alleviate electromagnetic interference (EMI), soft switching technique has been developed for power converters. For example, one soft switching converter is an active clamped resonant dc link (ACRDCL) converter in U.S. Pat. No. 4,864,483, issued Sep. 5, 1989, which is hereby incorporated by reference. In the ACRDCL converter, a resonant circuit, incorporated with an active clamping switch and clamping capacitor, is used as an interface between a dc power supply and a dc bus supplying an inverter. The ACRDCL resonates periodically, bringing the dc link voltage to zero once each cycle. The inverter switching devices are switched on and off at zero voltage instants of the resonant dc link, thus achieving essentially lossless switching. However, the ACRDCL converter has some disadvantages, such as, high voltage stress across the inverter switches and continuous resonant operation of the dc link. To overcome the disadvantages of the ACRDCL converter, an auxiliary quasi-resonant dc link (AQRDCL) converter has been developed in U.S. Pat. No. 5,172,309, issued Dec. 15, 1992, which is hereby incorporated by reference. The AQRDCL converter is employed to achieve soft-switching in an inverter coupled to a dc power supply via a resonant dc link circuit. The resonant dc link circuit includes a clamping switch limiting the dc bus voltage across the inverter to the positive rail voltage of the dc supply and auxiliary switching device(s) assisting resonant operation of the resonant bus to zero voltage in order to provide a zero-voltage switching opportunity for the inverter switching devices as the inverter changes state.

Despite their advantages, both the ACRDCL converter and the AQRDCL converter have the following common disadvantages: (1) The resonant dc link circuit acts as an interface (i.e., a dc-to-dc converter) between the dc power supply and the inverter and needs to transmit real power and to carry dc current from the dc power supply to the inverter or from the inverter back to the dc power supply via switch(es) and/or resonant component(s), which can lead to significant power losses; (2) The voltage clamping, voltage control, and charge balancing become difficult due to the real power transmission; (3) The current stress on the auxiliary switch(es) and clamping switch(es) is at least as high as that on the inverter main switches; and (4) Two resonant dc link circuits are needed for an ac-to-dc-to-ac converter to implement soft-switching at both ac-to-dc power conversion stage and dc-to-ac power conversion stage.

Therefore, it is desirable to develop a new soft-switching power converter that can overcome the above-mentioned disadvantages of the ACRDCL converter and AQRDCL converter. Accordingly, an auxiliary resonant dc tank (ARDCT) is employed merely to provide a quasi-resonant or resonant dc bus across the converter without transmitting real power and carrying dc current. Moreover, such an ARDCT circuit should have no problems of voltage clamping and balancing and be capable of providing opportunity for soft-switching at both ac-to-dc power conversion stage and dc-to-ac conversion stage of an ac-to-ac converter, thus making the converter circuit more compact and efficient.

OBJECTS OF THE INVENTION

Accordingly, it is an object of the present invention to provide a new and improved soft-switching power converter.

It is another object of the present invention to provide an ARDCT coupled to a power converter without the necessity of transmitting real power and carrying dc current from a dc power supply to an inverter and from an inverter back to a dc power supply.

It is another object of the present invention to provide an ARDCT providing soft-switching opportunity to both the ac-to-dc power conversion stage and dc-to-ac conversion stage of an ac-to-ac converter.

It is another object of the present invention to provide a soft-switching converter with high efficiency, low voltage and current stresses, and a minimal number of components.

Further and other objects of the present invention will become apparent from the description contained herein.

SUMMARY OF THE INVENTION

An ARDCT converter includes an auxiliary resonant dc tank circuit coupled across a dc bus linking an inverter directly to a dc power supply. In one preferred embodiment, the ARDCT circuit consists of upper and lower resonant capacitors connected in series as a resonant leg, first and second dc tank capacitors connected in series as a tank leg, and an auxiliary resonant circuit comprising a series combination of a resonant inductor and a pair of auxiliary switching devices connected together for bi-direction current control and bi-direction voltage blocking. The auxiliary resonant circuit is coupled across the junction of the upper and lower resonant capacitors and the junction of the first and second dc tank capacitors. In an alternative embodiment, the auxiliary resonant circuit employs a single auxiliary switching device for bi-direction current flow and uni-direction voltage blocking. In another alternative embodiment, the auxiliary resonant circuit employs no auxiliary switching device. The lower resonant capacitor is coupled across the dc bus of the inverter. The resonant leg of the upper and lower resonant capacitors is coupled in parallel with the tank leg of the first and second dc tank capacitors providing a stable dc tank voltage. Further, the ARDCT converter includes a first clamping means, comprising a clamping switch with an anti-parallel clamping diode, for holding the resonant dc bus voltage to the dc tank voltage and a second clamping means for clamping the resonant dc bus voltage to zero during a resonant period.

The ARDCT circuit only absorbs any difference between the inverter bus current and the dc supply current. That is, only the dc ripple current of the inverter bus flows into the dc tank capacitors, thus a small capacitance of the dc tank capacitors is enough to provide a stable tank voltage. In addition, the dc tank voltage is not affected by output frequency of the inverter. The auxiliary resonant circuit is triggered into conduction by gating one of the auxiliary switches only when the inverter main switches are in the process of switching. A current is established in the resonant inductor to assist resonance of the dc bus to zero voltage in order to provide a zero-voltage switching opportunity for the inverter switching devices and back to the dc tank voltage after the inverter changes state. The dc tank voltage is controlled to a desired value. Unlike the ACRDCL converter and AQRDCL converter, the ARDCT circuit is coupled in parallel with the dc power supply and the inverter for merely assisting soft-switching of the inverter without participating in real dc power transmission and power conversion. Hence, malfunction and failure of the tank circuit will not affect the functional operation of the inverter and a highly reliable converter system is expected.

Other alternative embodiments are possible. For example, the lower resonant capacitor can be distributed to small snubber capacitors each in parallel with an inverter switching device. Also the ARDCT topology of the present invention may be employed to achieve soft-switching in a variety of suited types of converters, such as ac-to-ac converters, conventional single-phase inverters, multiphase inverters, and bridge inverters for switched reluctance motor (SRM) drives.

REFERENCE NUMERALS IN DRAWINGS

10—dc power supply
11—ac-to-dc converter
12—ac-to-dc converter with snubber capacitors
20—ARDCT Circuit
21—modified ARDCT Circuit with single auxiliary switch
21a, 21b, 21c—ART circuit for each phase leg
22—modified ARDCT Circuit with no auxiliary switch
23—modified ARDCT Circuit with no auxiliary switch and no clamping switch
24—modified ARDCT Circuit with no auxiliary switch and no clamping device
25—modified ARDCT Circuit without direct disposal of lower resonant capacitor
26—modified ARDCT Circuit with direct second clamping means
27—modified ARDCT Circuit with second clamping switch and diode
30—inverter
31—inverter with snubber capacitors
33—main inverter with magnetic-coupled phase legs
40—inverter bridge for SRM drives
41–43—SRM windings
55—first clamping means
71–73—inverter ac outputs
74–76—converter ac inputs

DETAILED DESCRIPTION OF THE INVENTION

Figure 1:
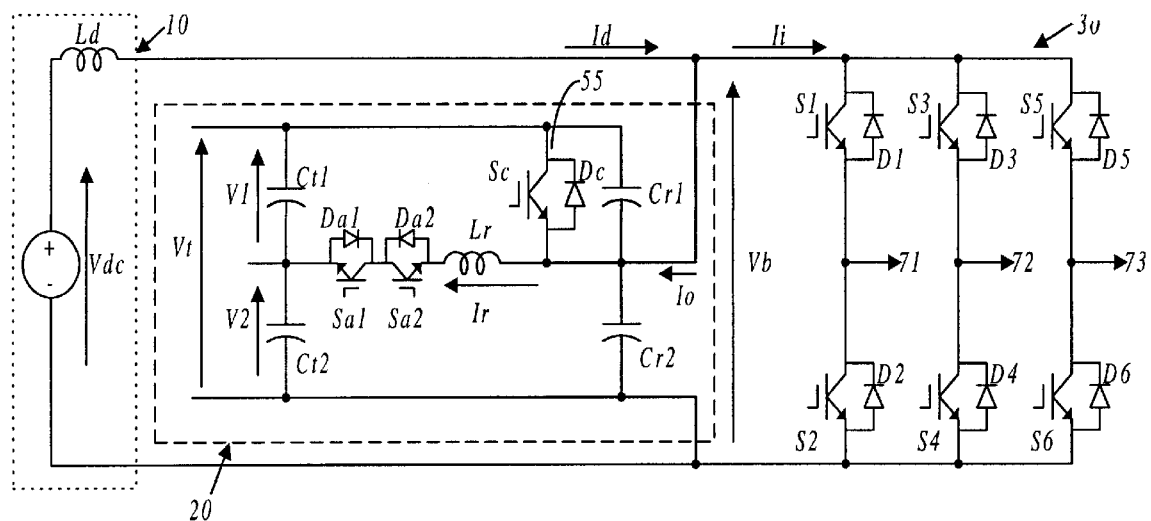
FIG. 1 is a schematic illustration of an auxiliary resonant dc tank converter according to a preferred embodiment of the present invention.

FIG. 1 illustrates an auxiliary resonant dc tank converter according to a preferred embodiment of the present invention. The ARDCT converter includes a dc power supply 10, i.e., Vdc and an internal dc inductor Ld, connected to a dc bus, a resonant dc tank circuit 20 coupled across the dc bus directly feeding an inverter 30. It should be noted that the ARDCT is employed to generate a resonant dc bus voltage while dc power is transmitted from the dc supply to the inverter or from the inverter back to the dc supply directly. This is advantageously different from the state-of-the-art soft-switching topologies, i.e., the ACRDCL converter and AQRDCL converter, respectively described in U.S. Pat. No. 4,864,483 and U.S. Pat. No. 5,172,309, cited hereinabove. The ARDCT circuit 20 consists of upper and lower resonant capacitors Cr1 and Cr2 connected in series as a resonant leg, first and second dc tank capacitors Ct1 and Ct2 connected in series as a tank leg, and an auxiliary resonant circuit comprising a series combination of a resonant inductor Lr and a pair of anti-parallel-coupled auxiliary switching devices Sa1 and Sa2. The auxiliary resonant circuit is coupled across the junction of the upper and lower resonant capacitors and the junction of the first and second dc tank capacitors. The lower resonant capacitor is coupled across the dc bus of the inverter. The resonant leg of the upper and lower resonant capacitors is coupled in parallel with the tank leg of the first and second dc tank capacitors providing a stable dc tank voltage Vt. Further, the ARDCT converter includes first clamping means 55, comprising a clamping switching device Sc with an anti-parallel clamping diode Dc, for holding the resonant dc bus voltage Vb to the dc tank voltage Vt and second clamping means, described hereinbelow, for clamping the resonant dc bus voltage to zero during a resonant period.

From the description above, it is apparent to those skilled in the art that other equivalent resonant capacitor configuration may be used in lieu of capacitors, Cr1 and Cr2, described hereinabove, such as integrating the resonant capacitors into one single capacitor across clamping means 55 or across the auxiliary resonant circuit. Also by way of example, inverter 30 as shown in FIG. 1 comprises a three-phase inverter having two main switching devices per phase and an anti-parallel diode coupled with each main switching device. However, it is apparent that the ARDCT converter of the present invention may be used for soft-switching in various inverter topologies, such as, inverter bridges for switched reluctance motor drives, as described hereinafter.

Figure 2:
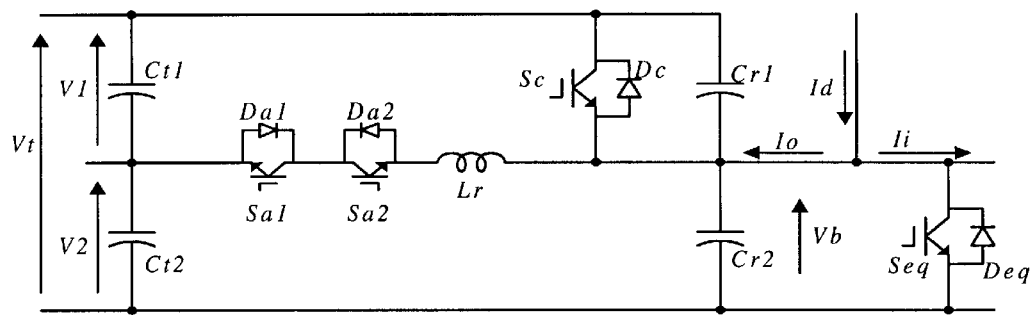
FIG. 2 is a schematic illustration of a circuit equivalent to that of FIG. 1 during resonant cycle for understanding the operation principle thereof.

FIG. 2 illustrates a circuit equivalent to the ARDCT converter of FIG. 1 as seen from the ARDCT circuit for understanding the operation thereof. In FIG. 2, switching device Seq and diode Deq represent the equivalent switch and diode of the main switching devices S1–S6 and the anti-parallel diodes D1–D6 of inverter 30, respectively. Diode Deq provides the second clamping means for clamping the resonant dc bus voltage Vb to zero during a resonant cycle, as described hereinbefore. In FIG. 2, the current that flows into the ARDCT circuit, i.e., tank current Io, is represented by $$Io = Id - Ii,$$

where Id is the dc supply current and Ii is the inverter dc bus current as shown in FIG. 1. Therefore, the ARDCT circuit only absorbs the difference of the inverter bus current and the dc supply output current. It should be also noted that an average value of tank current Io is equal to zero, neglecting losses of the ARDCT circuit. Advantageously, current stress of the clamping devices Sc and Dc is much smaller than that of the clamping devices used in the ACRDCL converter and the AQRDCL converter.

Figure 3:
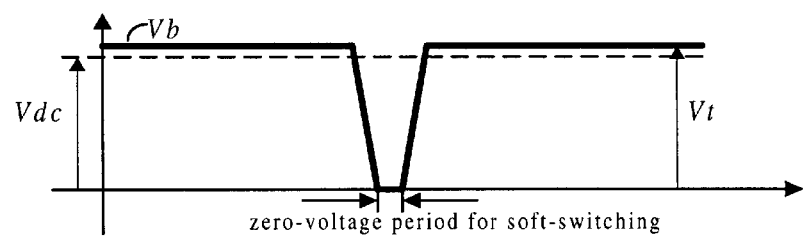
FIG. 3 is a graphic illustration of resonant dc bus voltage of FIG. 1.

FIG. 3 graphically illustrates the resonant dc bus voltage Vb. When the inverter is in the process of switching, the dc bus voltage Vb should be brought down to zero first in order for the inverter main switching devices to switch at zero voltage. To explain how to operate the ARDCT circuit in detail, the equivalent circuit of FIG. 2 is used.

When tank current Io initially flows in clamping diode Dc or when a relatively small value of tank current Io is carried through clamping switch Sc, a resonance can be started by gating on auxiliary switch Sa1.

Figure 4A:
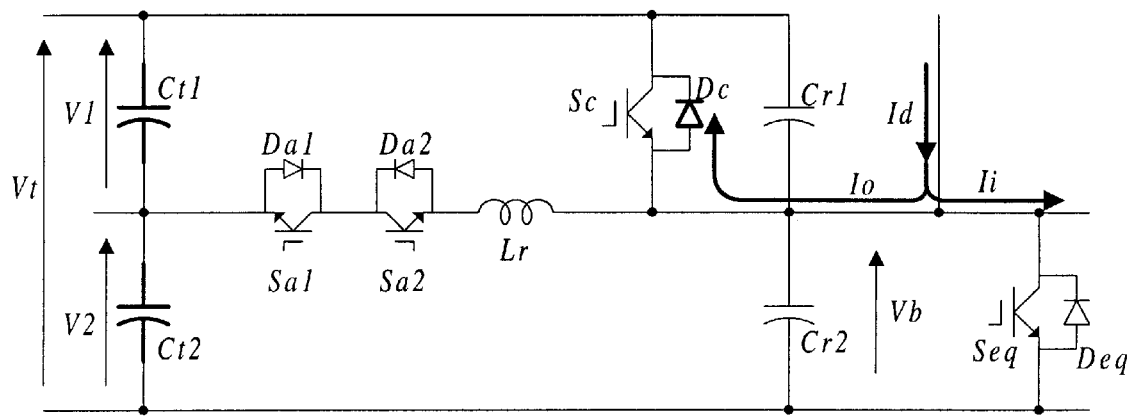
FIGS. 4a–4l schematically illustrate the operation sequence and current flow in the equivalent circuit of FIG. 2 during resonant cycle.
Figure 4B:
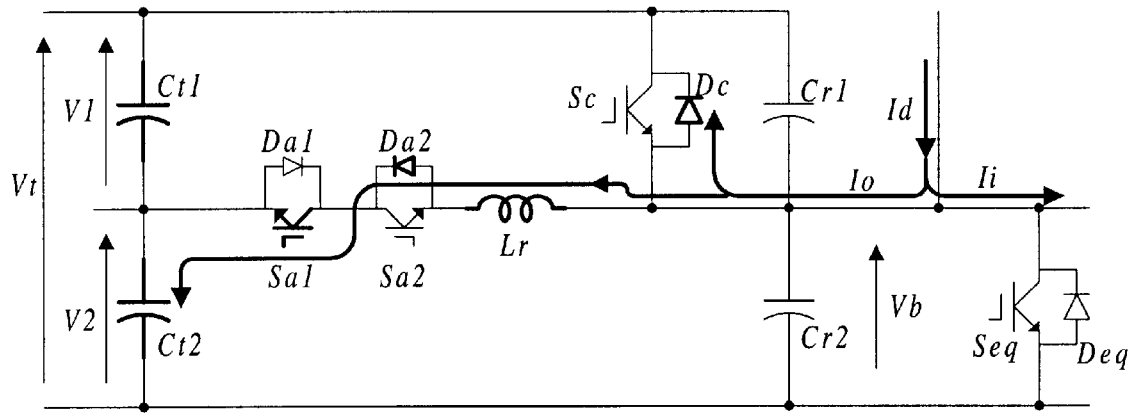
Figure 4C:
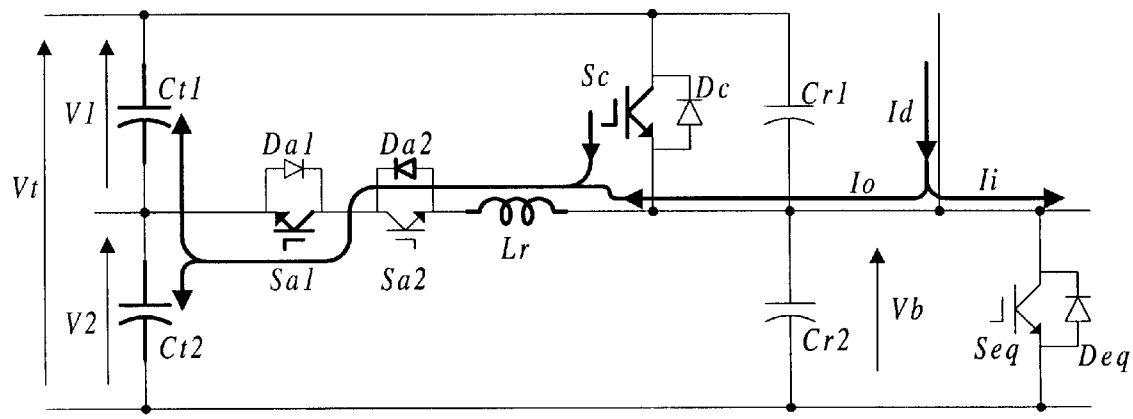
Figure 4D:
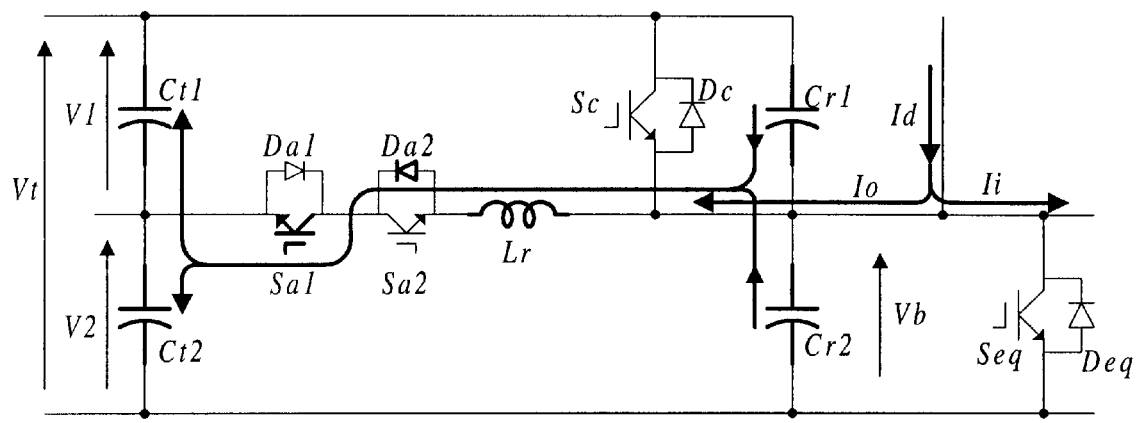
Figure 4E:
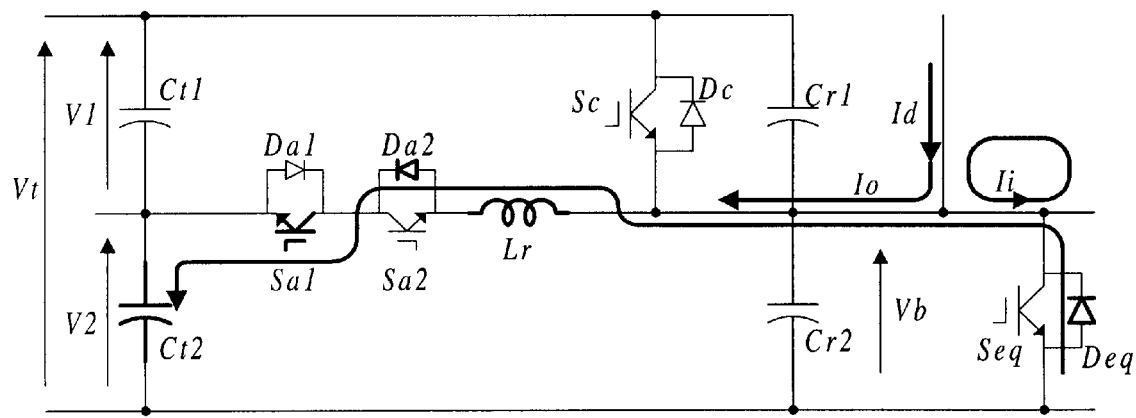
Figure 4F:
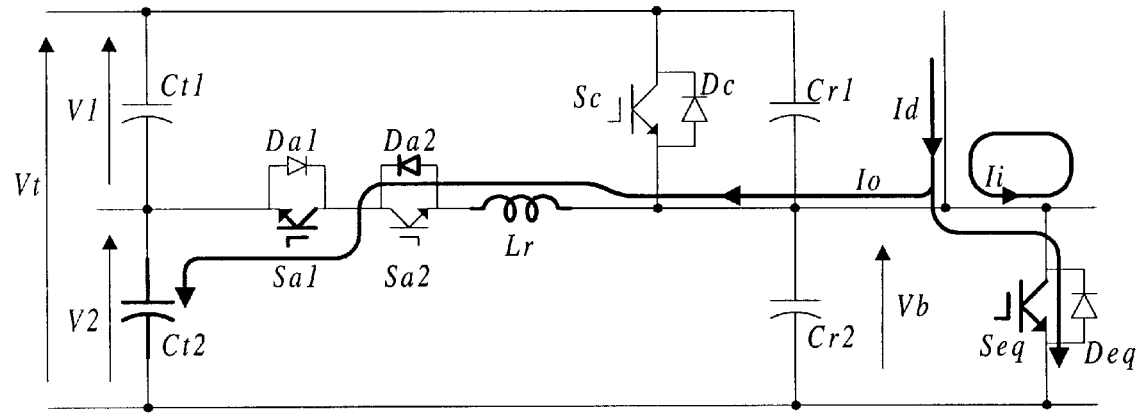
Figure 4G:
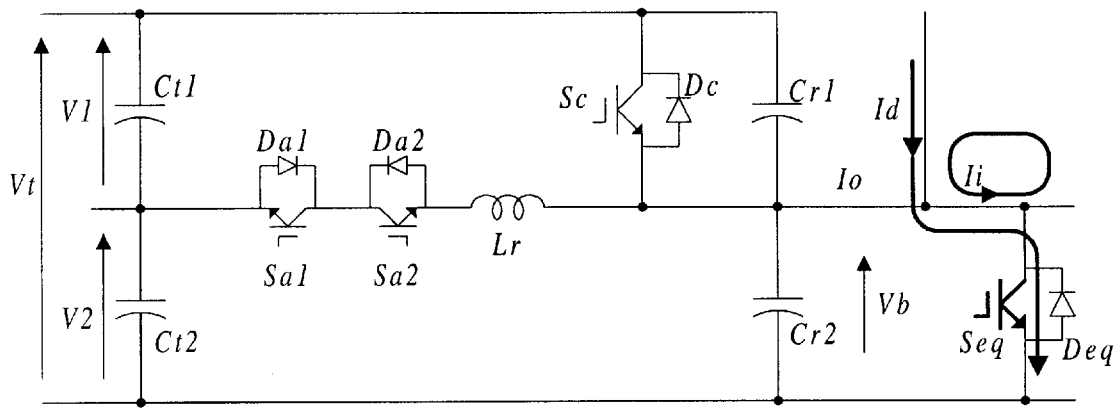
Figure 4H:
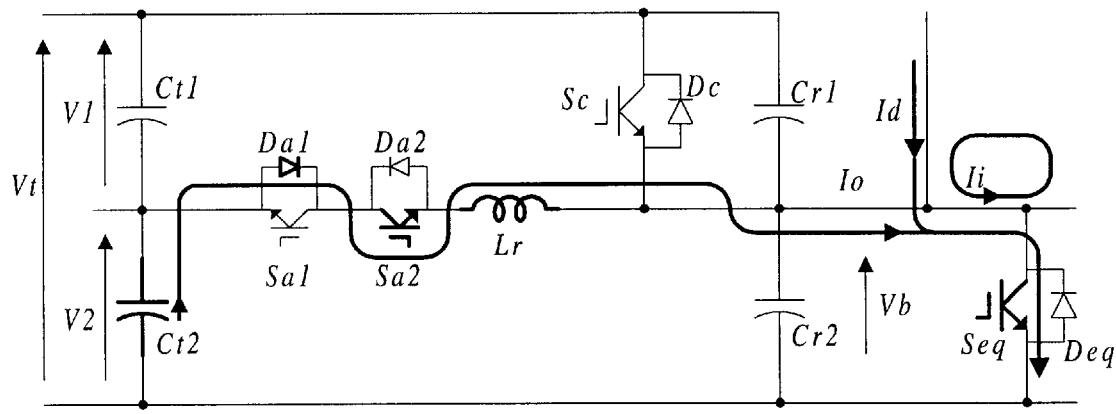
Figure 4I:
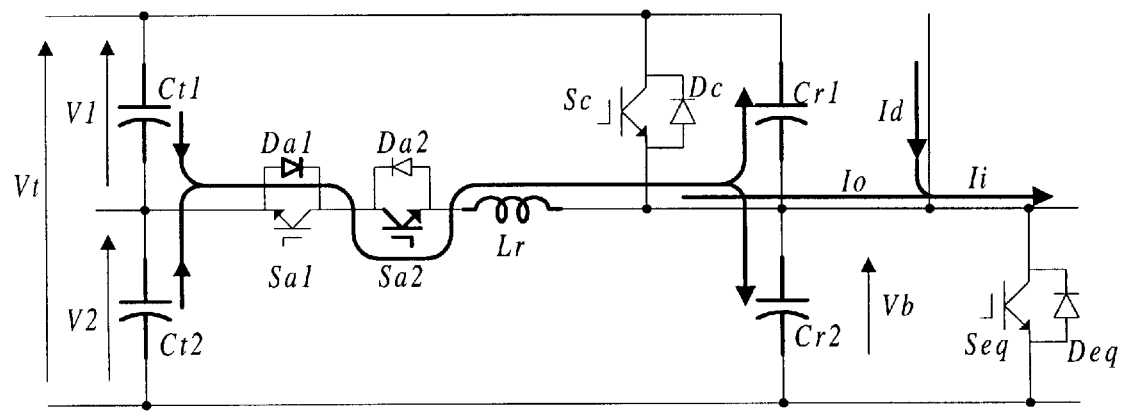
Figure 4J:
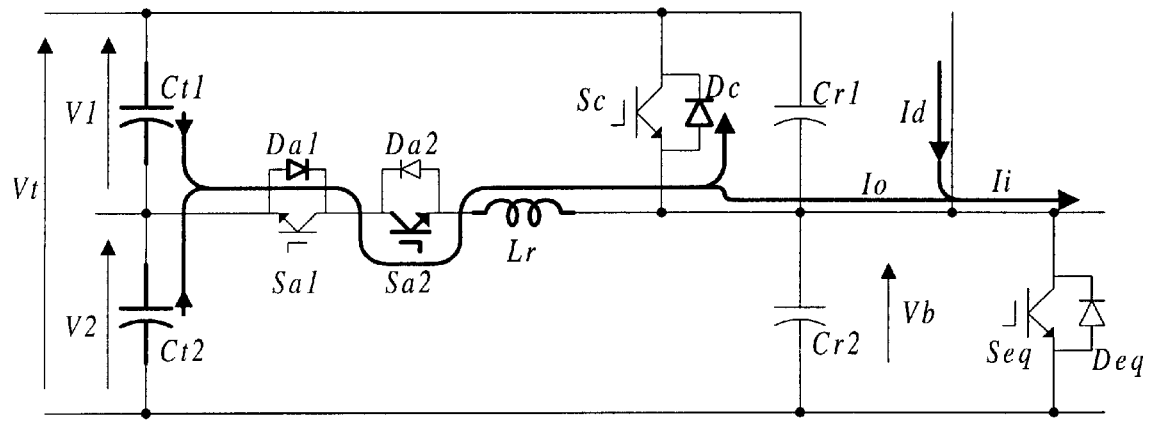
Figure 4K:
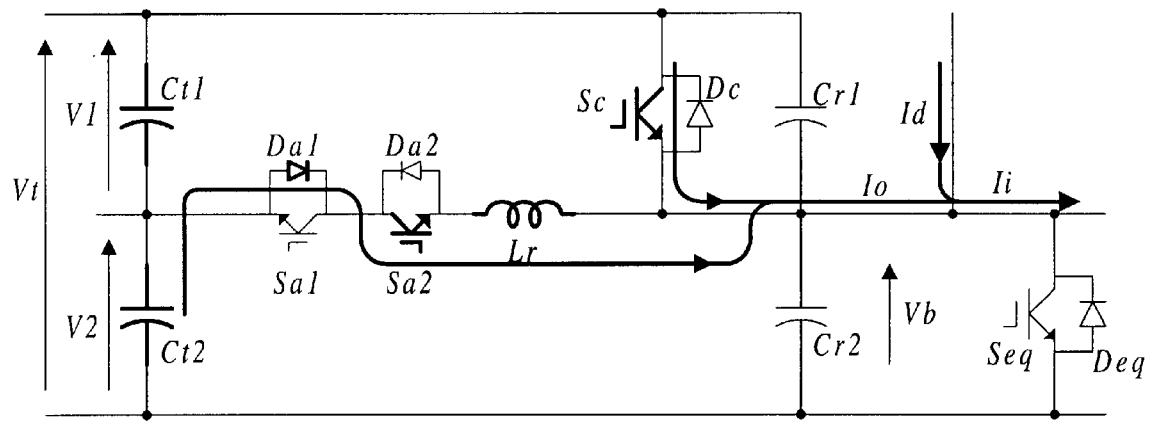
Figure 4L:
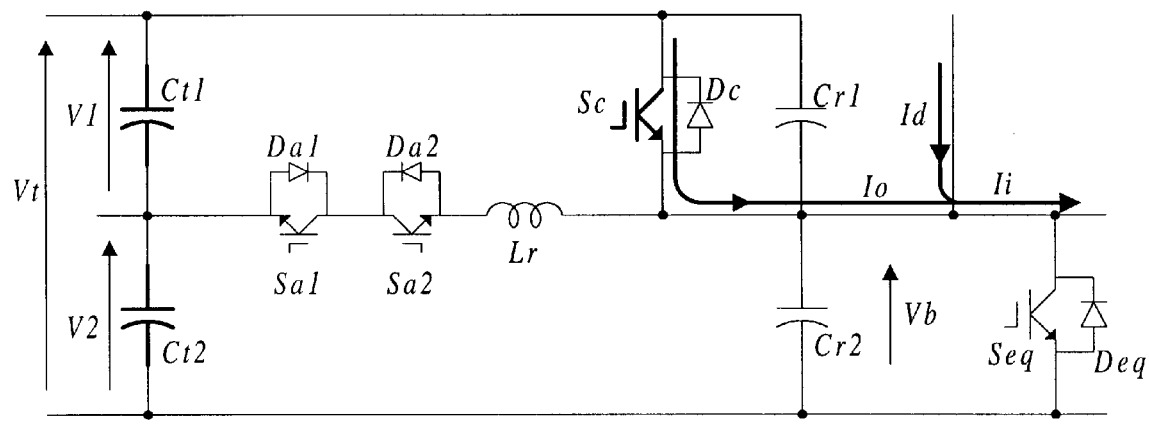

For example, FIGS. 4a–4l schematically illustrate the operation sequence and current flow in the equivalent circuit of FIG. 2 during resonant cycle when tank current Io initially flows in clamping diode Dc. FIG. 4a shows the initial condition that tank current Io initially flows in clamping diode Dc. Clamping switch Sc is gated on although it carries no current. The auxiliary resonant circuit is triggered into conduction by gating on auxiliary switch Sa1 as shown in FIG. 4b. A current is established in resonant inductor Lr with holding on clamping switch Sc. When the current in resonant inductor Lr becomes larger than Io, clamping switch Sc conducts as shown in FIG. 4c. Further when this resonant inductor current reaches a specified level, clamping switch Sc is gated off. Consequently, this resonant inductor current charges and discharges resonant capacitors Cr1 and Cr2, respectively, thus assisting resonance of the dc bus to zero voltage as shown in FIG. 4d. After the dc bus voltage, Vb, reaches zero and the resonant inductor current attempts to negatively charge resonant capacitor Cr2, thus equivalent diode Deq takes over the surplus current and clamping the dc bus voltage to zero as illustrated in FIG. 4e. At this point, all the main switches of the inverter are gated on, thus forming a shorted circuit. In other words, the inverter dc bus current, Ii, circulates through the inverter itself. The resonant inductor current will decreases since voltage V2 is against the current. When the resonant inductor current becomes less than dc supply current Id, equivalent switch Seq conducts as shown in FIG. 4f. The resonant inductor current will decay to zero. Holding off auxiliary switch Sa2 can keep the dc bus voltage to zero voltage without resonant current as shown in FIG. 4g. Thus the zero-voltage period as shown in FIG. 3 can be controlled by auxiliary switch Sa2. When auxiliary switch Sa2 is gated on, a reverse current is established in resonant inductor Lr through equivalent switch Seq (FIG. 4h). After the reverse resonant inductor current reaches a specified level the inverter changes state, i.e., equivalent switch Seq turns off. The resonant inductor current charges and discharges resonant capacitors Cr2 and Cr1, respectively, thus bringing the dc bus voltage back to the dc tank voltage (FIG. 4i). When the dc bus voltage attempts to overshoot the dc tank voltage, clamping diode Dc conducts as shown in FIG. 4j. At this point, clamping switch Sc is gated on and will conducts when the resonant inductor current becomes less than (Id–Ii) as shown in FIG. 4k. The resonant inductor current decreases to zero, the dc bus voltage is clamped to the dc tank voltage through clamping switch Sc as shown in FIG. 4l. The dc tank voltage is automatically balanced at a voltage level Vt slightly higher than the dc supply voltage Vdc so that the average value of the resonant dc bus voltage Vb is equal to the dc supply voltage Vdc neglecting losses in dc inductor Ld and clamping devices Sc and Dc.

When a relatively high tank current Io initially flows in clamping switch Sc, there is no need to gate on auxiliary switching device Sa1. A sufficiently high tank current Io can discharge resonant capacitor Cr2 and bring the dc bus voltage to zero by directly turning off clamping switch Sc. After the dc bus voltage reaches zero, equivalent diode Deq takes over tank current Io and clamping the dc bus voltage to zero. Then the same control described hereinabove is employed to resonate the dc bus voltage back to the tank voltage.

Figure 5:
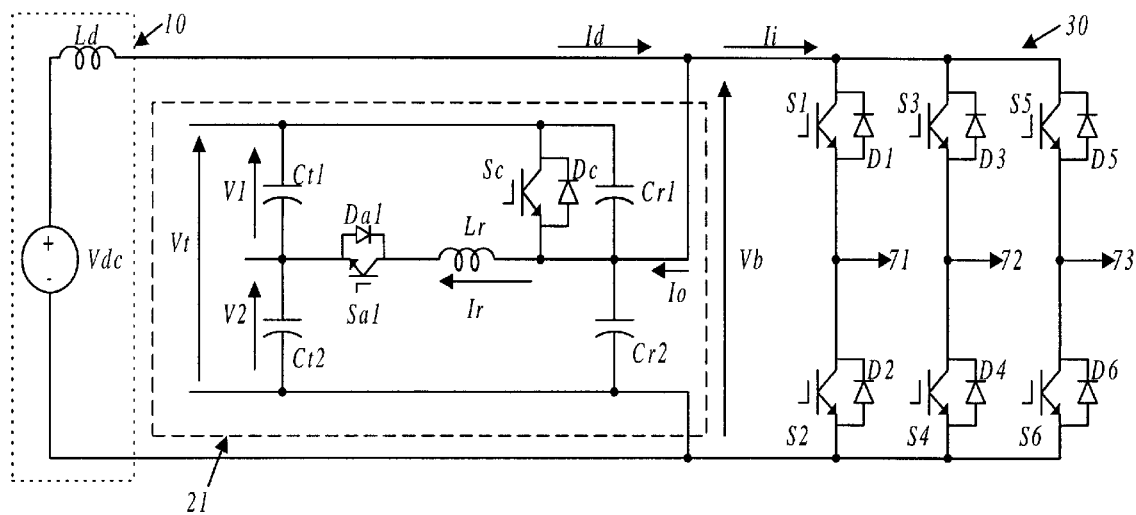
FIG. 5 is a schematic illustration of an alternative embodiment of an ARDCT converter of the present invention.

In an alternative embodiment of an ARDCT converter according to the present invention, the auxiliary resonant circuit employs a single auxiliary switching device as shown in FIG. 5. In FIG. 5, one of the auxiliary switches Sa2 and its anti-parallel diode Da2 are eliminated. Without Sa2 current in the resonant inductor Lr reverses immediately after its reaching zero, thus without active control capability of the zero-voltage period. The resonant dc bus voltage waveform for the ARDCT without Sa2 and Da2 is similar to that of the ARDCT with Sa1, Da1, Sa2 and Da2, as shown in FIG. 3, except that the zero-voltage period is only dependent on future inverter dc bus current Ii and not actively controllable.

Figure 6:
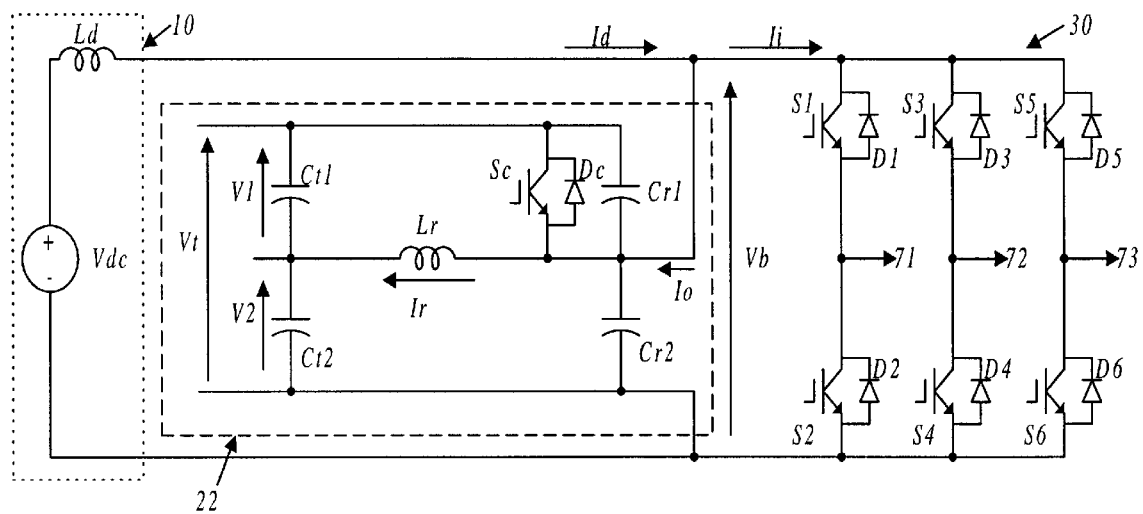
FIG. 6 is a schematic illustration of another alternative embodiment of an ARDCT converter of the present invention.

In another alternative embodiment of an ARDCT converter according to the present invention, the auxiliary resonant circuit employs no auxiliary switching device as shown in FIG. 6.

Figure 7:
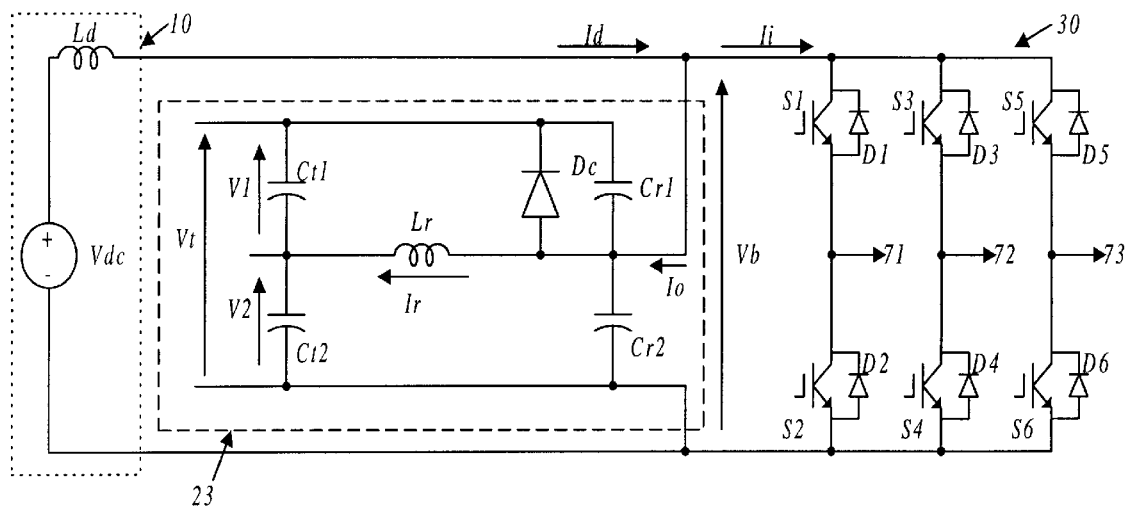
FIG. 7 is a schematic illustration of another alternative embodiment of an ARDCT converter of the present invention.

In another alternative embodiment of an ARDCT converter according to the present invention, the auxiliary resonant circuit employs no auxiliary switching device and no clamping switching device as shown in FIG. 7.

Figure 8:
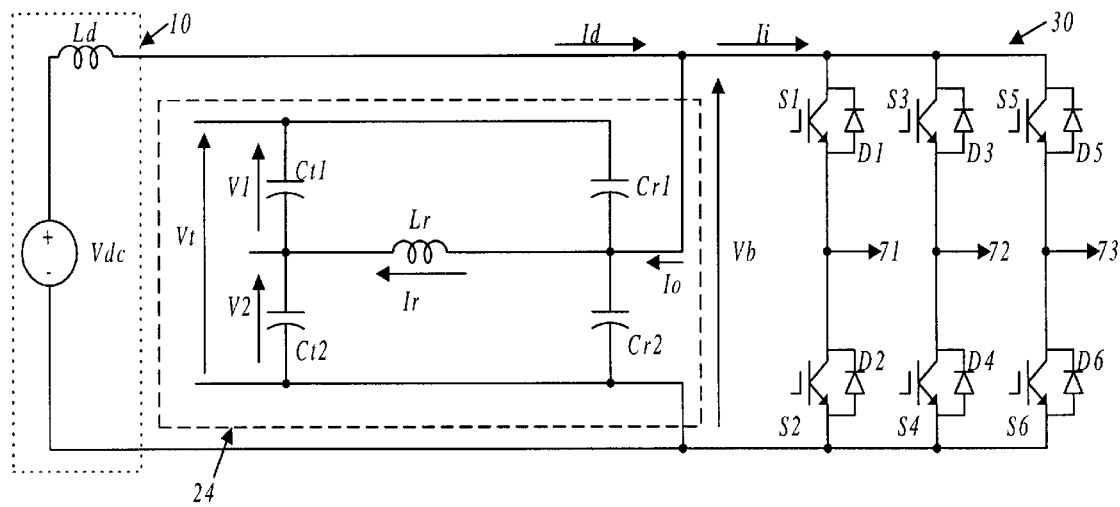
FIG. 8 is a schematic illustration of another alternative embodiment of an ARDCT converter of the present invention.

In another alternative embodiment of an ARDCT converter according to the present invention, the auxiliary resonant circuit employs no auxiliary switching device and no upper clamping device as shown in FIG. 8.

In the embodiments of FIGS. 6, 7, and 8, resonant inductor Lr and resonant capacitors Cr1 and Cr2 form a resonant circuit providing a stable high-frequency oscillated dc bus voltage which reaches zero during each resonant cycle, thereby giving an soft-switching opportunity for the inverter main switching devices. Without any auxiliary switch, however, the clamping switch is required to operate at the resonant frequency of the resonant circuit, which can lead to significant switching losses. In addition, the required constant resonance of the resonant circuit can also lead to significant losses in the resonant inductor although these embodiments provide less and/or no additional switching devices.

Figure 9A:
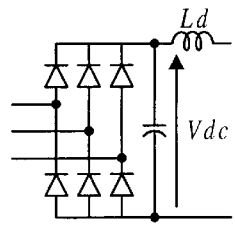
FIGS. 9a–c are schematic illustrations of preferred dc power supply embodiments of an ARDCT converter of the present invention using a diode bridge.
Figure 9B:
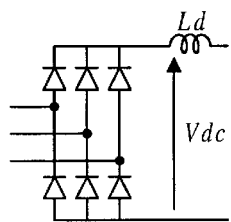
Figure 9C:
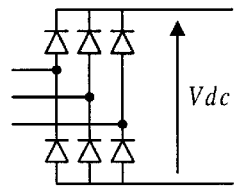

FIGS. 9a–c are schematic illustrations of preferred embodiments of dc power supply 10 of an ARDCT converter according to the present invention. In each of the embodiments of FIGS. 9a–c, a diode bridge is employed as a dc power supply to feed the ARDCT circuit and the inverter.

Figure 10:
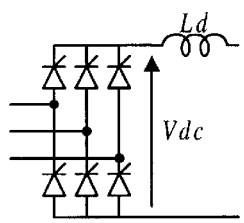
FIG. 10 is a schematic illustration of another dc power supply embodiment of an ARDCT converter of the present invention using a thyristor bridge.

FIG. 10 is a schematic illustration of another dc power supply embodiment of an ARDCT converter of the present invention. In FIG. 8, a thyristor rectifier is employed as a dc power supply to feed the ARDCT circuit and the inverter.

Figure 11:
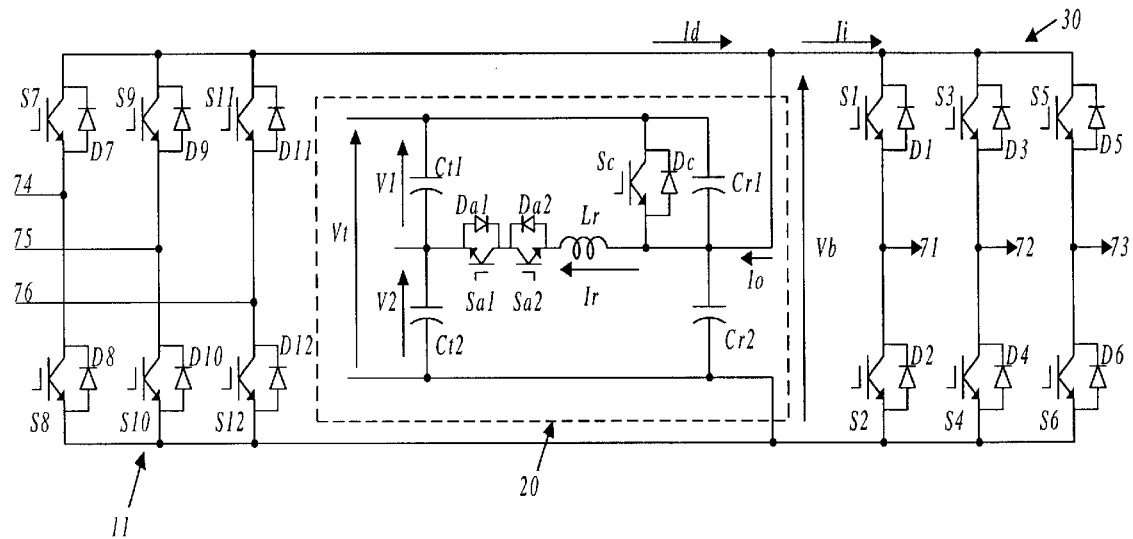
FIG. 11 is a schematic illustration of a preferred embodiment of an ARDCT converter of the present invention providing soft-switching opportunity for both the ac-to-dc power conversion and dc-to-ac conversion of an ac-to-ac converter.

By way of example, FIG. 11 is a schematic illustration of a preferred embodiment of an ARDCT converter of the present invention providing soft-switching opportunity for both ac-to-dc power conversion and dc-to-ac conversion of an ac-to-ac converter. In the embodiment of FIG. 11, converter 11 providing ac-to-dc power conversion is directly coupled across a dc bus feeding inverter 30. An ARDCT circuit (tank circuit 20) of the present invention is employed to generate resonant voltage across the dc bus.

Figure 12:
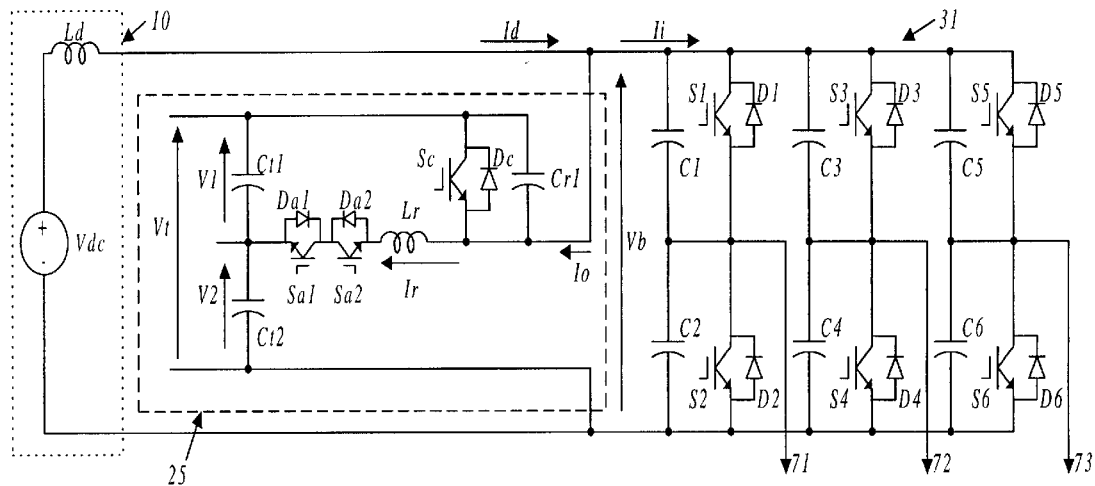
FIG. 12 is a schematic illustration of another preferred embodiment of an ARDCT converter of the present invention.

FIG. 12 is a schematic illustration of another preferred embodiment of an ARDCT converter of the present invention, which is a modification of the converter of FIG. 1. In FIG. 12, resonant capacitor Cr2 as shown in FIG. 1 is distributed to small capacitors, C1–C2, C3–C4 and C5–C6, each in parallel with an inverter main switching device.

Figure 13:
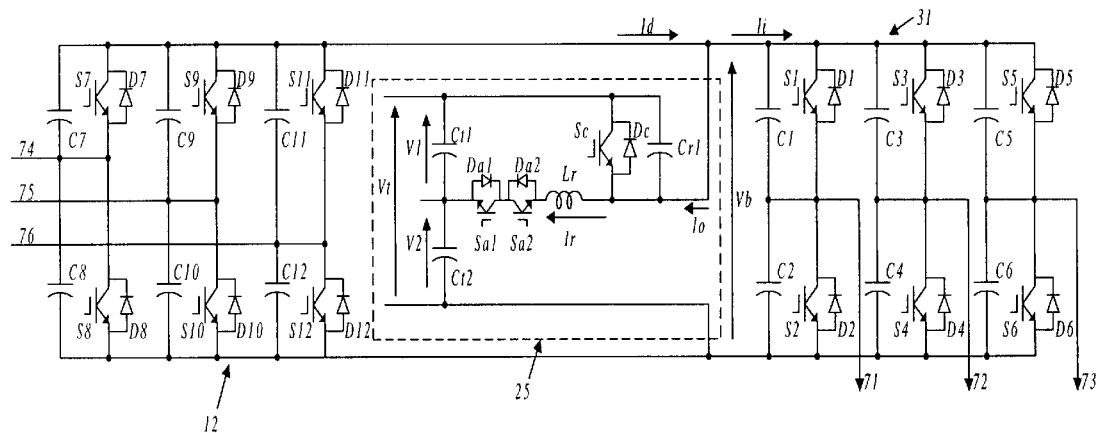
FIG. 13 is a schematic illustration of an alternative embodiment of an ARDCT converter of the present invention providing soft-switching opportunity for both ac-to-dc power conversion and dc-to-ac conversion of an ac-to-ac converter.

FIG. 13 is a schematic illustration of an alternative embodiment of an ARDCT converter of the present invention providing soft-switching opportunity for both ac-to-dc power conversion and dc-to-ac conversion of an ac-to-ac converter, where small capacitors, C1–C2, C3–C4 and C5–C6, each in parallel with a main switch of inverter 30 and small capacitors, C7–C8, C9–C10 and C11–C12, each in parallel with a main switch of converter 12 form the lower resonant capacitor. Therefore, FIG. 13 is a modification of the converter of FIG. 11.

Figure 14:
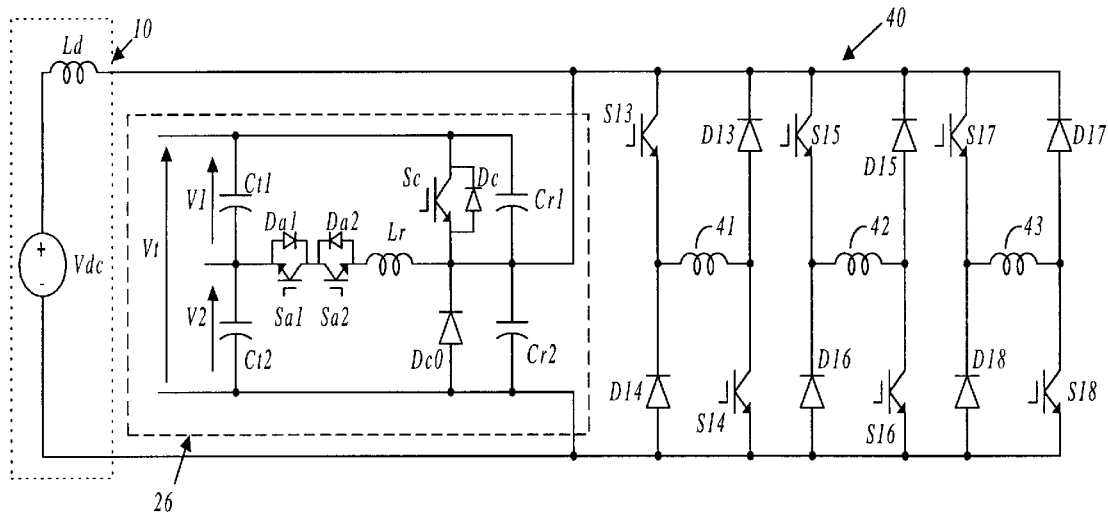
FIG. 14 is a schematic illustration of an ARDCT converter of the present invention for SRM drives.

By way of example, FIG. 14 is a schematic illustration of an ARDCT converter of the present invention for SRM drives, where inverter 40 has three phase legs, each leg feeding a SRM phase winding 41–43. In the ARDCT converter of FIG. 1, the anti-parallel diodes, D1–D6, of inverter 30 form an equivalent diode, Deq, as shown in FIG. 2, providing the second clamping means for clamping the resonant dc bus voltage Vb to zero during a resonant cycle.

Figure 15:
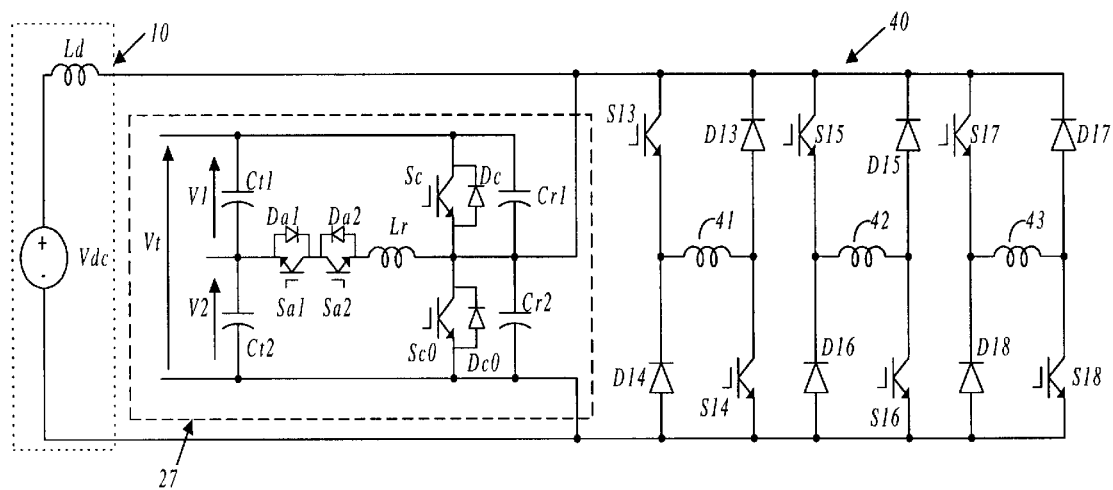
FIG. 15 is a schematic illustration of an alternative ARDCT converter of the present invention for SRM drives.
Figure 16:
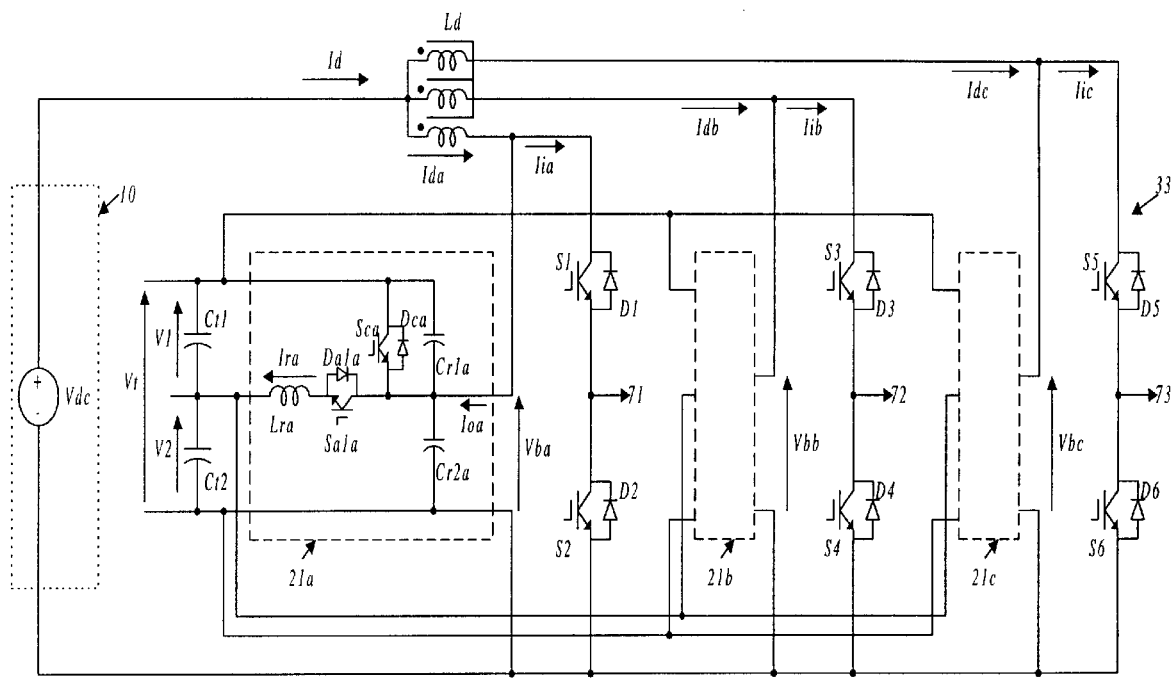
FIG. 16 is a schematic illustration of an alternative embodiment of an ARDCT converter of the present invention providing an independent soft-switching opportunity for each phase leg of the inverter.

However, the ARDCT converter for SRM drives requires an additional clamping diode, Dc0, to function as the second clamping means since diodes in inverter 40 of FIG. 14 are not coupled directly in series across the dc bus. In addition, inverter 40 does not form an equivalent switch, Seq, as shown in FIG. 2 because the switching devices, S13–S18, are not directly coupled together. Therefore, an additional switch Sc0, as shown in FIG. 15, is needed in order to have the bus shorting capability. The operating principle of FIG. 15 is identical to that of FIG. 1. Also like the ARDCT converter of FIG. 1, the ARDCT converters of FIG. 14 and FIG. 15 are operable without one of the auxiliary switching devices in similar fashion as the converter of FIG. 5 and without any auxiliary switching devices in similar fashion as the converter of FIG. 6. FIG. 16 is a schematic illustration of an alternative embodiment of an ARDCT converter of the present invention providing an independent soft-switching opportunity for each phase leg of the inverter. The DC inductor, Ld, sharing one magnetic core, is split out to the three phase legs of inverter 33. Each phase leg has its own ART circuit. The three independent ART circuits (21a, 21b, and 21c) share the same tank capacitors, Ct1 and Ct2. The operating principle is exactly the same as previously mentioned. Since each phase leg has its own ART circuit, this embodiment is more suited for those applications.

The present invention provides a new and improved soft-switching converter that has features of low current/voltage stresses, high reliability, low component count and high efficiency. While the above description contains many specifics, these should not be construed as limiting the scope of the invention but as merely illustrating some of the presently preferred embodiments of this invention, Therefore, it is contemplated and will be apparent to those skilled in the art from the preceding description and accompanying drawings that modifications and/or changes may be made in the preferred embodiments of the present invention. Accordingly, it is expressly intended that the true spirit and scope of the present invention be determined by reference to the appended claims and their legal equivalents.

What is claimed is:

1. An auxiliary resonant dc tank converter, comprising:

an ac power supply and an ac bus;

a dc power supply for providing dc current to a dc bus;

an inverter having at least one phase leg connected to said ac bus and connected across said dc bus, said inverter having at least one main switching device per phase leg; and a resonant dc tank circuit coupled in parallel with said dc power supply for generating a resonant voltage across said dc bus, said resonant dc tank circuit including;

an upper resonant capacitor and a lower resonant capacitor connected in series as a resonant leg, a first dc tank capacitor and a second dc tank capacitor connected in series as a tank leg, and an auxiliary resonant circuit, said auxiliary resonant circuit being coupled across the junction of said upper and lower resonant capacitors and the junction of said first and second dc tank capacitors, said lower resonant capacitor being coupled across said dc bus, said resonant leg being coupled across said tank leg.

2. The auxiliary resonant dc tank converter of claim 1 wherein:

said auxiliary resonant circuit comprises a resonant inductor.

3. The auxiliary resonant dc tank converter of claim 1 wherein:

said auxiliary resonant circuit comprises a series combination of a resonant inductor and auxiliary switching means.

4. The auxiliary resonant dc tank converter of claim 1 wherein:

said resonant dc tank circuit includes first clamping means for limiting the dc bus voltage to the tank voltage of said tank capacitors and second clamping means for clamping the resonant dc bus voltage to zero during a resonant period.

5. The auxiliary resonant dc tank converter of claim 4 wherein:

said first clamping means comprises a clamping diode coupled across said first resonant capacitor.

6. The auxiliary resonant dc tank converter of claim 4 wherein:

said first clamping means comprises a clamp switching device with an anti-parallel clamping diode coupled across said first resonant capacitor.

7. The auxiliary resonant dc tank converter of claim 4 wherein:

each phase leg of said inverter includes two series-connected main switching devices each coupled with an anti-parallel diode; and said second clamping means comprises the series combination of the anti-parallel diodes coupled across one of said main switching devices.

8. The auxiliary resonant dc tank converter of claim 1 wherein:

a dc power supply is connected across said dc bus, said dc power supply comprises a diode rectifier bridge for receiving the input power from a power system and for providing dc voltage.

9. The auxiliary resonant dc tank converter of claim 1 wherein:

a dc power supply is connected across said dc bus, said dc power supply comprises a thyristor rectifier bridge for receiving the input power from a power system and for providing dc voltage.

10. The auxiliary resonant dc tank converter of claim 1 wherein:

a dc power supply is connected across said dc bus, said dc power supply comprises a converter for receiving the input power from a power system and for providing dc voltage, said converter having at least one main switching device per phase leg.

11. The auxiliary resonant dc tank converter of claim 1 wherein:

each phase leg of said inverter has its own resonant dc tank circuit and is connected to each other through magnetic coupling, and further the tank leg of the resonant dc tank circuit of each phase leg is coupled to each other.

12. The auxiliary resonant dc tank converter of claim 3 wherein:

said auxiliary switching means comprises a pair of auxiliary switching devices connected together for bi-direction current control and bi-direction voltage blocking.

13. The auxiliary resonant dc tank converter of claim 3 wherein:

said auxiliary switching means comprises a pair of auxiliary switching devices connected in series, each of said auxiliary switching devices being coupled with an auxiliary anti-parallel diode.

14. The auxiliary resonant dc tank converter of claim 3 wherein:

said auxiliary switching means comprises one auxiliary switching device coupled with an auxiliary anti-parallel diode.

15. The auxiliary resonant dc tank converter of claim 4 wherein:

said second clamping means comprises a diode coupled across said dc bus.

16. The auxiliary resonant dc tank converter of claim 4 wherein:

said second clamping means comprises an additional switching device coupled across said dc bus, said additional switching device being coupled with an anti-parallel diode.

17. The auxiliary resonant dc tank converter of claim 1 wherein:

said lower resonant capacitor comprises snubber capacitors each coupled in parallel with a main switching device of said inverter.

18. The auxiliary resonant dc tank converter of claim 10 wherein:

said lower resonant capacitor comprises snubber capacitors each coupled in parallel with a main switching device of said converter.

19. In a resonant dc tank converter having a resonant dc tank circuit for generating a resonant voltage across a dc bus, said resonant dc tank circuit including upper and lower resonant capacitors connected in series as a resonant leg, first and second dc tank capacitors connected in series as a tank leg, and an auxiliary resonant circuit comprising a series combination of a resonant inductor and auxiliary switching means, said auxiliary resonant circuit being coupled across the junction of said upper and lower resonant capacitors and the junction of said first and second dc tank capacitors, said lower resonant capacitor being coupled across said dc bus, said resonant leg being coupled across said tank leg, said resonant dc tank circuit further including first clamping means for limiting the dc bus voltage to the tank voltage of said tank capacitors and second clamping means for clamping the resonant dc bus voltage to zero during a resonant period, said first clamping means comprising a clamp switching device with an anti-parallel clamping diode, a control method comprising the steps of:

turning on said auxiliary resonant circuit to establish a resonant current to a specific level for assisting resonance of said dc bus from the dc tank voltage of said dc tank leg to zero when said clamping diode conducts or when a relatively low current flows through said clamp switching device;

gating off said clamp switching device when said resonant current reaches a specific level or when a high current flows through said clamp switching device to start a resonance on said dc bus;

clamping said dc bus to zero voltage using said second clamping means;

turning on main switching devices of said inverter when a reverse resonant current is needed to boost the resonant dc bus voltage back to the dc tank voltage;

maintaining said auxiliary resonant circuit on until said reverse resonant current reaches a specific level;

changing state of said inverter to a predetermined setting;

allowing said dc bus to resonate back to the tank voltage of said dc tank leg;

turning on said clamp switching device after the voltage of said dc bus reaches the tank voltage of said dc tank leg; and turning off said auxiliary resonant circuit when the resonant current through said resonant inductor is substantially zero.

* * * * *